Patented May 7, 1935

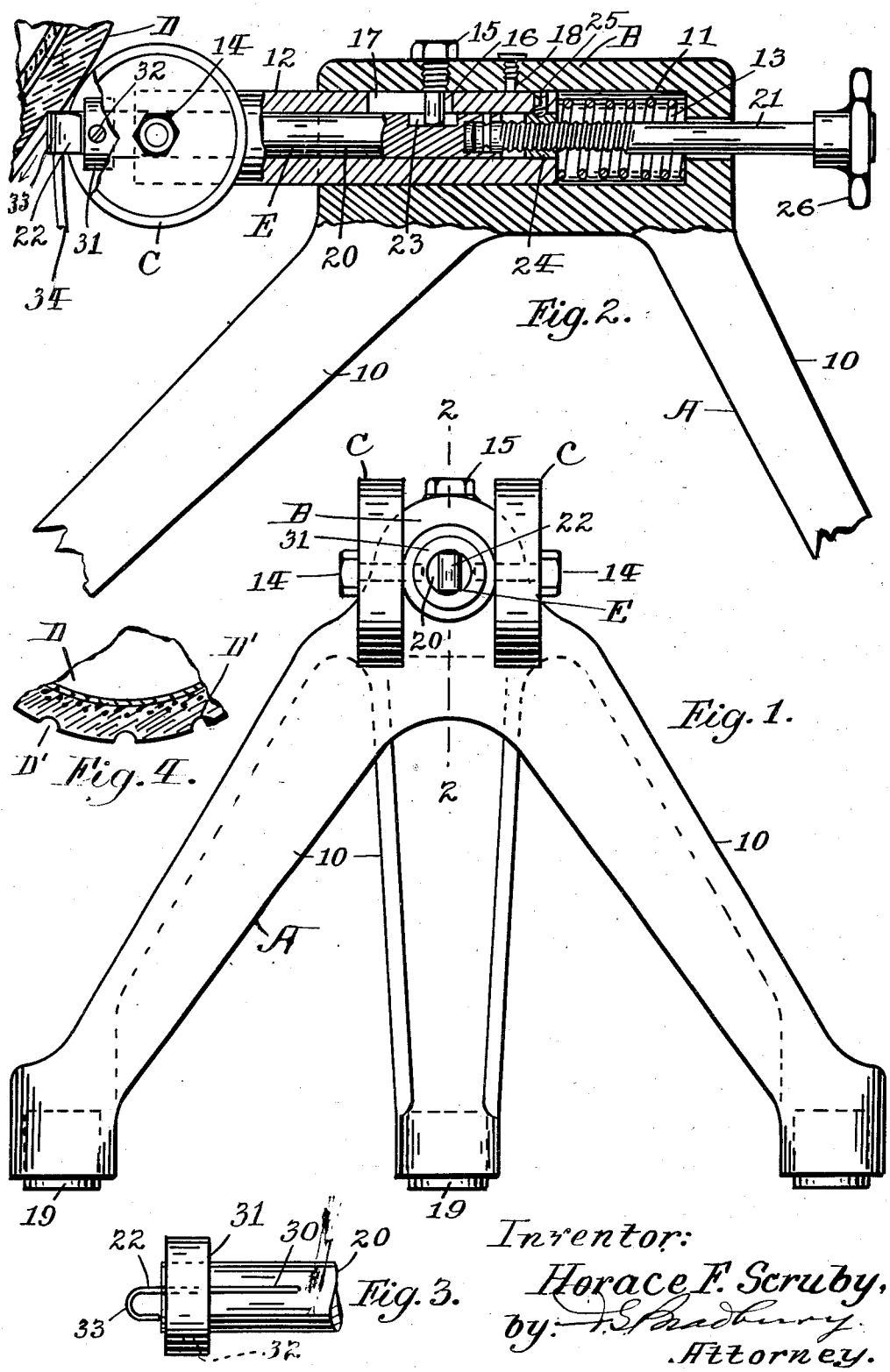

2,000,300

UNITED STATES PATENT OFFICE 2,000,300

TIRE GROOVING MACHINE

Horace F. Scruby, Beverly Hills, Calif.

Application April 11, 1932, Serial No. 604,503

5 Claims. (Cl. 82—4)

An object of this invention is the production of a simple and inexpensive implement by the use of which the tread surface of a used or new vehicle tire can be easily, quickly and effectively grooved to reduce tendency of the tire slipping and skidding on slippery, muddy or sandy roads. A further object is the production of a device of the class stated which will automatically conform with irregularities in the surface of the tire while cutting a groove at regulated depth and without hand manipulation other than the pre-adjustment of the device. Among further objects is to provide a portable device for grooving the tread surface of a resilient tire while the latter is mounted upon a wheel of a vehicle and while the wheel without removal from the vehicle is raised clear of its support below and revolved freely.

With these and other objects in view my invention comprises the features of construction and combinations of parts hereinafter described and claimed.

In the accompanying drawing, forming part of this specification, Fig. 1 is a front elevation of my invention; Fig. 2 is a longitudinal section of a detail taken on the line 2—2 of Fig. 1, part of the cutter gauge being in full, and a small detail of a pneumatic tire to which the groove cutter is shown applied being shown in section as when the device is in use; Fig. 3 is a plan of a detail of the groove cutter and its sliding shaft removed from the supporting head of the stand, and Fig. 4 is a cross section of a small detail of a grooved tire.

In the drawing, A indicates a stability stand having supporting legs 10, (more particularly hereinafter described) arranged below and integral with a suitable supporting head B. Said supporting head has a horizontal passage or bore 11 in which is slidably seated a sleeve 12, the inner end of which is impressed against a compression helical spring 13 at one end of said head and the outer end of which carries a pair of coaxially arranged antifriction gauge rollers or wheels C, journaled on stud bolts 14 and disposed on opposite sides of the sleeve so that their peripheries will roll against the tread surface of the tire such as D, to be grooved as at D' (see Fig. 4) when the stand is properly adjusted. A stud 15, threaded in the wall of the head and having a smooth surfaced outer end 16 passing through a longitudinal slot 17, serves to limit the free travel of the sleeve longitudinally in the head and to prevent the sleeve from rotating, thus holding the anti-friction gauge rollers C in rotating alignment with the tread surface of the tire when the stand is adjusted for use. An oil hole 18 in the head is for the purpose of applying lubricant to the working surfaces between the sleeve and the bore of the head. The feet of the stand have downwardly projecting friction inserts 19 held upwardly therein to prevent the stand from slipping on its support. Normally when the stand is adjusted for use with the gauge rollers in rolling contact against the tread surface of the tire to be grooved after the vehicle wheel has been raised out of contact with the ground in position to freely revolve downwardly, sufficient pressure is brought to bear by the gauge rollers against the tire surface to compress the spring 13 so that the rollers follow irregularities in the tire surface as the tire is revolved.

The sleeve 12 also carries tire groove cutting means E, which consists of a cutter shaft 20, projecting from the forward end of said sleeve, a vertically disposed cutting knife on the forward end of the shaft and a regulating shaft 21, swiveled in the inner end of the cutting shaft and projecting through the head to enable the operator to adjust the knife blade to its work by turning the regulating shaft by means of a handle 26 thereon. The cutter shaft is smooth so as to slide freely longitudinally in the sleeve. It is also prevented from rotating but permitted to slide a limited distance by the shank 16 entering slot 23 therein. The knife is thus disposed adjacent to and between the gauge rollers C and when adjusted to its work while in vertical position lies in a horizontal plane below the axis of the wheel (not shown) and the tire which is being grooved by my improved device. The swiveled shaft regulating member 21 projects through the head and its body is threaded in a collar 24 which is secured in the sleeve 20 by a set screw 25. The depth of cut taken by the knife 22 in the tread surface of the tire can thus be easily regulated from time to time. As the adjusting of the cutter is relative to the gauge wheels it follows that the knife through its connection with the sleeve follows the depth of cut defined by the rollers as the rollers turn against the tread surface of the tire which is being grooved.

The knife blade 22 has its forward projecting end 33 bent into semi-circular shape and is so held by the cutter shaft 20 as to cut a semi-circular groove such as D' in the tread surface of the tire D and guide the strip 34 so removed from the tire freely downwardly. The knife blade is supported by the cutter shaft by clamping its shank in a slot 30 across the end of the cutter shaft by a collar 31, the latter being secured on the shaft by a set screw 32 or other suitable means.

The stand A may have any number of legs 10 desired but I have found that by the use of three legs, two of which project below and forwardly of the cutter blade 22 and the remaining one projects rearwardly, stability of the stand for holding the knife to its work is increased. Thus the knife blade is held rigidly in cutting coaction with the tread surface of the tire and the combined height and angle of the knife with respect to the tire results in a force acting in a line within the base of the machine and in a direction normal to the base plane. This resulting force holds the knife to its work automatically.

Assuming that the device is to be used for grooving the tread surface of a tire circumferentially, while the tire is mounted upon the wheel of a vehicle, the vehicle is jacked up so that the wheel will revolve freely. Preferably the tire remains inflated in its normal condition and the stand of my improved grooving device is stationed in close proximity to the tire with its knife 22 directed in position to be applied for grooving the tread surface. The knife is then adjusted by turning the handle 26 into position to cut the groove at the desired depth, the anti-friction gauge rollers being previously impressed in rolling contact against the tread surface and maintained through the horizontal resilient support of the knife, an even depth of groove cut by the knife, irrespective of whether or not the tread surface is concentric, eccentric or irregular to the axis of rotation of the tire by the wheel. The height of the stand is such as to apply the cutting action of the knife to the tread surface of the tire below the axis of the wheel and the blade remains vertical so that as the wheel is revolved slowly in a downward direction against the cutting edge of the knife a clean cut is made by the knife and the strip removed is guided freely through the blade downwardly. As many circumferential grooves can be cut in the tread surface as desired to reduce tendency of the tire skidding and these grooves can be cut in the tread surfaces of new tires or smoothly worn used tires to recondition the latter. Preferably the tire is inflated while the groove cutter is applied but the device is applicable for use under conditions when the tire is not inflated. Also the device can be used when the tire is not mounted on a wheel of a vehicle, such other uses necessarily requiring other means than shown for causing relative motion between the tire and grooving device so that the latter can be used. The anti-skidding inserts 19 assist in maintaining the stand stationary on its support while the device is in use.

In accordance with the patent statutes, I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to secure by Letters Patent is:

1. A device for grooving the tread surface of a tire circumferentially, consisting of a knife supporting shaft in proximity to said tread surface having a slotted end, a groove cutting knife having substantially a semi-circular cutting edge and a shank inserted in the slot in the end of said shaft, a collar around the slotted end of and contacting said shaft to hold said shank, means for supporting said shaft and an antifriction guard cooperating with said knife to define the depth of cut imparted by the knife in said tread surface.

2. A device for grooving the tread surface of a tire circumferentially, consisting of a frame in proximity to said tread surface, a sleeve movable longitudinally on said frame, a knife holder slidable in said sleeve, and a pair of antifriction rollers on opposite sides of said knife holder and riding on said tire surface for limiting the travel of and steadying said knife holder and the surrounding sleeve with respect to each other and to the surface of a tire of uneven diameter.

3. A device for grooving the tread surface of a tire circumferentially, consisting of a frame adapted to be placed in proximity to said tread surface, a sleeve, a knife holder in said sleeve, said parts being telescopically mounted to permit changes in longitudinal relationship between the knife holder and sleeve, a groove cutting knife carried by one end of the knife holder, gauge rollers carried on opposite sides of the sleeve adjacent to said knife, said rollers evenly supporting the sleeve and riding the surface of the tire for maintaining an even depth of cut by the knife in accordance with the circumferential contour of the tread surface, means for adjusting the knife holder and sleeve longitudinally to each other, and resilient means for maintaining the gauge means against the tread surface.

4. A device for grooving the tread surface of a tire, consisting of a frame adapted to be placed in proximity to said tread surface, a sleeve, a knife holder in said sleeve, said parts being telescopically mounted to permit changes in longitudinal relationship between the knife holder and sleeve, a groove cutting knife carried by one end of the knife holder, gauge means on opposite sides of said sleeve riding the surface of the tire and carried by the sleeve adjacent to said knife for maintaining an even depth of cut by the cutter in accordance with the circumferential contour of the tread surface, means for adjusting the knife holder and sleeve longitudinally to each other, resilient means against one end of said sleeve for maintaining the gauge means against said tread surface and a stud and slot connection between said knife holder, sleeve and frame adapted to limit the travel of said holder and surrounding sleeve with respect to each other and to said frame in substantially all directions.

5. An apparatus for grooving tires, comprising, a support having a recess therein, a gauge member slidable in the recess, a spring in the recess between the gauge member and the end wall of the recess and arranged to urge the gauge against the tire, a groove forming cutter carried by the gauge member, and a screw passing through an opening in the end wall of the recess and through the spring, and having one end swivelled into the cutter and an intermediate portion threaded into the gauge member and also having means at the opposite end by which it may be turned.

HORACE F. SCRUBY.